Aug. 23, 1927.
C. M. HEETER
SPUDDING WHEEL
Filed April 30, 1923
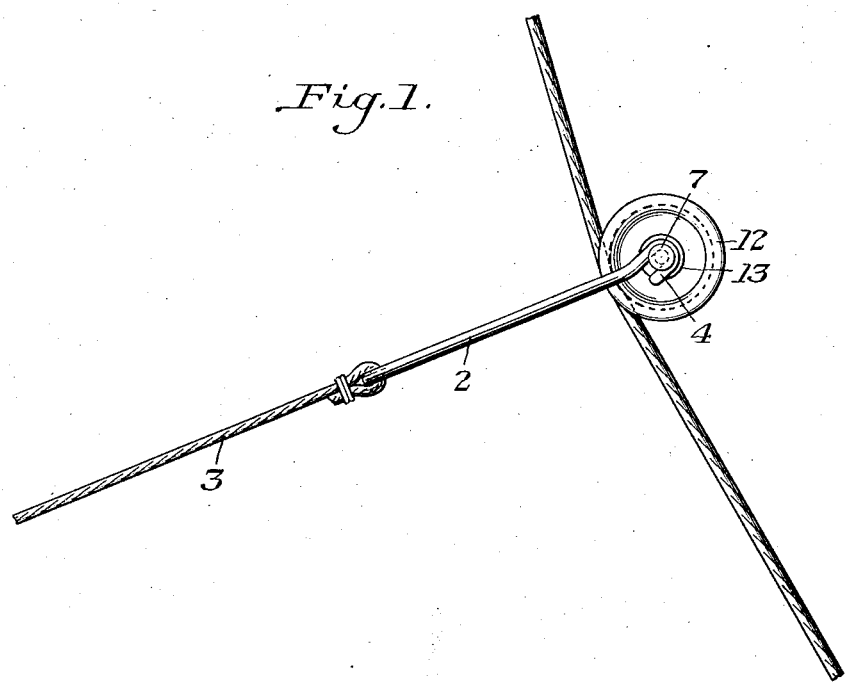
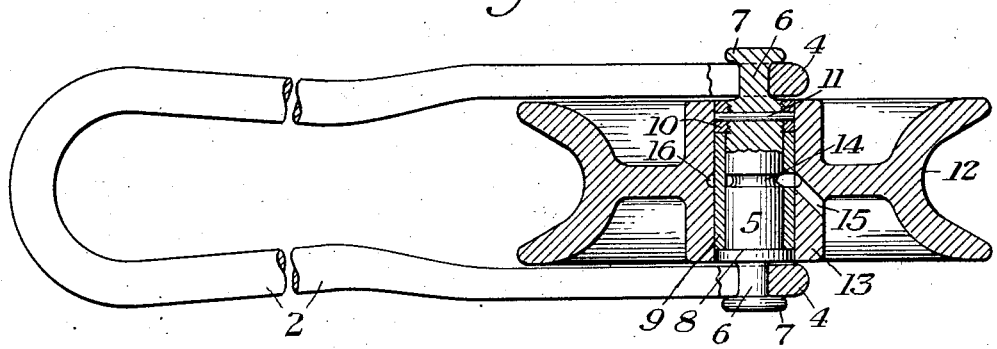
INVENTOR
Charles M. Heeter, Patented Aug. 23, 1927.

1,639,654

UNITED STATES PATENT OFFICE.

CHARLES M. HEETER, OF BUTLER, PENNSYLVANIA.

SPUDDING WHEEL.

Application filed April 30, 1923. Serial No. 635,531.

The present invention relates broadly to improvements in oil well rigs, and more particularly to an attachment to take the place of the spudding shoe ordinarily utilized.

At the present time it is customary to drill the first fifty or sixty feet of an oil well by an arrangement ordinarily described as "spudding," this operation being necessary by reason of the fact that the depth of the well at such times is not such as to render the use of the walking beam expeditious. Ordinarily, a spudding shoe has been provided for engagement with the drilling cable during this operation. This shoe has a sliding frictional engagement with the cable and tends to quickly wear the same. By this invention there is provided a spudding wheel adapted to bodily replace this spudding shoe.

In the accompanying drawings, there is shown, for purposes of illustration only, a preferred embodiment of this invention, it being understood that changes may be made in the construction and operation disclosed without departing from the spirit or scope of my broader claims.

In the drawings,—

Figure 1 is a side elevation of a spudding wheel embodying the present invention, and Figure 2 is a detail view, partly in section and partly in elevation, showing the spudding wheel construction.

A spudding wheel constructed in accordance with the present invention comprises a yoke 2 to which may be secured one of the operating cables 3. This yoke has its ends bent to form open hooks 4 adapted to detachably receive and form supporting bearings for an axle 5.

This axle is conveniently formed to provide yoke engaging portions 6 adjacent each end thereof, each of the yoke engaging portions being formed with a head 7 for holding the axle in the desired position. Intermediate the yoke engaging portions, the axle is formed with a shoulder 8. Abutting this shoulder at one end is a sleeve 9 which rotatably engages the intermediate portion of the axle 5 and which is held in position by a collar 10. The collar may be conveniently threaded onto the axle, and may then be secured in proper position to prevent end play of the sleeve 9, by a pin 11. The spudding wheel comprises a pulley 12 having a hub 13 of such internal diameter as to form a driven fit with the sleeve 9.

The external diameter of the sleeve 9 is slightly greater than that of the shoulder 8 and the collar 10, whereby the hub of the pulley may freely rotate around the shoulder and collar while held in position by the sleeve.

For lubricating the bearing surface provided between the sleeve and the collar, the axle may be formed with a circumferentially extending oil groove 14, and the sleeve and hub may be formed with alined openings 15 through which lubricant may be supplied. The body of the pulley may be formed with an annular groove 16 constituting an oil reservoir.

It will be apparent that this construction provides a large bearing surface between the sleeve and axle whereby the length of life of the spudding wheel is greatly increased. At the same time, the construction makes it possible to provide a smooth outer surface for all of the spudding wheel parts, whereby the arms of the yoke 2 may extend closely adjacent the sides of the pulley and thereby prevent the cable from becoming jammed therebetween.

In the assembly of the parts, the sleeve is preferably placed around the axle 5, and the collar 10 is then secured in position in any suitable manner, as by the pin 11. This may then be driven as a unit into the hub of the pulley. In case renewal is necessary, the axle assembly may be driven out as a unit, and a new assembly substituted.

The advantages of the present invention arise from the provision of a spudding wheel by means of which the spudding shoe may be replaced and the life of the cable thereby increased.

Further advantages arise from the specific construction of spudding wheel whereby the drilling cable is effectively maintained in proper position with respect thereto.

I claim:

1. In a spudding wheel, a pulley, an axle rotatably mounted therein, a yoke having open bearings engaging the ends of the axle, and means in the pulley for holding the axle against longitudinal movement relative to the pulley independent of the yoke, the bore of the pulley being such that the assembled axle and holding means can be inserted in the pulley through one end of the bore, substantially as described.

2. In a spudding wheel, an axle assembly having a yoke-engaging portion adjacent each end of the axle, a shoulder on the axle intermediate said portions, a sleeve rotatable on said axle and abutting said shoulder at one end, said sleeve having an external diameter slightly greater than the diameter of said shoulder, means on the axle engaging the opposite end of said sleeve for holding the same in position, a pulley having a driven fit with said sleeve, said axle assembly being arranged to be driven into the wheel as a unit, and a yoke detachably cooperating with said axle, substantially as described.

3. An axle assembly for spudding wheels, comprising an axle having reduced bearing portions adjacent each end, a shoulder adjacent one bearing portion, a sleeve surrounding said axle and abutting against said shoulder at one end, and a collar carried by said axle and abutting against said sleeve at the other end, said sleeve having a greater external diameter than the diameter of said shoulder and collar, said axle assembly being arranged to be inserted into the wheel as a unit, substantially as described.

4. An axle assembly for spudding wheels, comprising an axle having reduced bearing portions adjacent each end, a shoulder adjacent one bearing portion, a sleeve surrounding said axle and abutting against said shoulder at one end, and a collar carried by said axle and abutting against said sleeve at the other end, said sleeve having a greater external diameter than the diameter of said shoulder and collar, said assembly being adapted to be driven as a unit axially into the bore of a spudding wheel, the sleeve having a driving fit with the bore in the spudding wheel for retaining the assembly in position therein, substantially as described.

In testimony whereof I have hereunto set my hand.

CHARLES M. HEETER.